United States Patent
Martelaro et al.

(10) Patent No.: US 11,720,806 B2
(45) Date of Patent: Aug. 8, 2023

(54) RECOMMENDATION ENGINE FOR DESIGN COMPONENTS

(71) Applicant: Accenture Global Solutions Limited, Dublin (IE)

(72) Inventors: Nikolas Martelaro, San Francisco, CA (US); Maria Pilar Ergueta McGinley, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 432 days.

(21) Appl. No.: 16/798,994

(22) Filed: Feb. 24, 2020

(65) Prior Publication Data

US 2021/0264296 A1 Aug. 26, 2021

(51) Int. Cl.
*G06N 5/04* (2023.01)
*G06F 16/903* (2019.01)
*G06F 30/10* (2020.01)

(52) U.S. Cl.
CPC ......... *G06N 5/04* (2013.01); *G06F 16/90335* (2019.01); *G06F 30/10* (2020.01)

(58) Field of Classification Search
USPC ....................................................... 707/706
See application file for complete search history.

(56) References Cited

U.S. PATENT DOCUMENTS

| | | | |
|---|---|---|---|
| 7,412,658 B2 | 8/2008 | Gilboa | |
| 9,026,962 B2 | 5/2015 | Kruberg et al. | |
| 2004/0148586 A1* | 7/2004 | Gilboa | G06F 40/197 |
| | | | 705/348 |
| 2011/0208484 A1* | 8/2011 | Ezaki | G06F 30/30 |
| | | | 703/1 |

FOREIGN PATENT DOCUMENTS

EP 3667567 A1 * 6/2020 ............ G06F 17/16

* cited by examiner

*Primary Examiner* — Syling Yen
(74) *Attorney, Agent, or Firm* — Fish & Richardson P.C.

(57) ABSTRACT

Methods and system for recommending components to a user. Implementations are directed to receiving, from a user, a user query for a design recommendation, the user query comprising a plurality of terms; determining, from the plurality of terms, a user intent including at least one query-derived design function and not including a named component for the design recommendation; receiving additional contextual information for the design recommendation, wherein the additional contextual information comprises a plurality of action attributes for the at least one query-derived design function; determining, from a database, a plurality of design recommendations, wherein each design recommendation comprises a respective recommended component and a plurality of recommended component actions; selecting, from the plurality of design recommendations, a subset of design recommendations; and providing, to the user, the subset of design recommendations.

17 Claims, 4 Drawing Sheets

RECOMMENDATION ENGINE FOR DESIGN COMPONENTS

TECHNICAL SUMMARY

This specification relates to search and recommendation of design components.

BACKGROUND

As new parts and components become available, there are limited channels for designers to become aware of them and, particularly, know how to use them. The burden for designers is sufficiently large such that a search process is typically limited to searching for specific parts based on specifications to meet a function that has already been determined by a human user. Designers becoming aware of new parts with new functionality is achieved mostly in an ad hoc way, e.g., through experience in a field that uses such new parts.

SUMMARY

Implementations of the present disclosure are generally directed towards capturing the context of a design problem posed by the user. A user can provide a natural-language query to a component recommendation engine, where the query includes terms defining at least one desired function of a component or multiple components, e.g., one or more actions performed by the component. In some implementations, actions of the system include auto-complete prompts while entering a search query based on context of prior user searches for that industry, material, and or functionality of the component type being searched. Implementations can elicit context from a user via an interactive user interface to provide better recommendations (in terms of satisfying a need expressed by a user) than are provided by current systems.

In some implementations, actions include: receiving, from a user, a user query for a design recommendation, the user query comprising a plurality of terms; determining, from the plurality of terms, a user intent including at least one query-derived design function and not including a named component for the design recommendation; receiving, e.g., from the user or otherwise, additional contextual information for the design recommendation, wherein the additional contextual information comprises a plurality of action attributes for the at least one query-derived design function; determining, from a database comprising design recommendations and based on the at least one query-derived design function and the additional contextual information, a plurality of design recommendations, wherein each design recommendation comprises a respective recommended component and a plurality of recommended component actions, and wherein each of the plurality of recommended component actions is associated with a set of one or more action attributes; selecting, from the plurality of design recommendations, a subset of design recommendations, each design recommendation meeting a threshold of similarity between the plurality of the query-derived design functions and the plurality of action attributes for the plurality of query-derived design functions and the plurality of recommended component actions and the action attributes for the recommended components of the design recommendation; and providing, to the user, the subset of design recommendations, wherein the presentation of each design recommendation comprises the respective recommended component and the plurality of recommended component actions and set of one or more action attributes for the recommended component.

Other implementations of this aspect include corresponding systems, apparatus, and computer programs, configured to perform the actions of the methods, encoded on computer storage devices.

These and other implementations can each optionally include one or more of the following features. Receiving the additional contextual information from the user can include a dialog process. Receiving additional contextual information from the user can include a plurality of component design considerations. Component design considerations can include fixed vs variable constraints. Component design considerations can include forwards-compatibility requirements. Receiving additional contextual information from the user can include user preference data. The method can further include generating, from the plurality of known actions and plurality of action attributes a query vector for the user query. Searching the database including design recommendations can include: searching a database of recommendation vectors, each recommendation vector includes a design recommendation, and wherein selecting the subset of design recommendations responsive to the user query includes comparing the respective recommendation vector to the query vector. The method can further include receiving from the user, user feedback responsive to the subset of design recommendations. The user feedback can include a selection, by the user, of a particular design recommendation of the subset of design recommendations. Collecting user feedback can include collecting usage data for the particular design recommendation including the recommended component. Usage data can be provided via the recommended component to the recommendation engine.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

These and other embodiments may be implemented to realize the following advantages. Allowing designers to search for unknown component based on function can reduce the burden of discovery for as-of-yet unknown components to the designer and can result in better part selection. By creating a searchable recommendation repository that is updated with new components, component function, and applications, the component recommendation engine can save time and effort required to learn new markets and parts, and create better solutions based on a more robust product database. Feedback from other designers and part manufacturers can be incorporated into the design recommendation database to generate new markets for components and refine recommendations provided to designers seeking design solutions. This feedback from designers and part manufacturers can then help other designers to select components. Feedback from designers and search queries can act as signals to part manufacturers regarding which kinds of products and functions they may want to build in the future. Implementations of a component recommendation engine described in this specification can link to open source solutions which are then more likely to be embraced in the design community.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
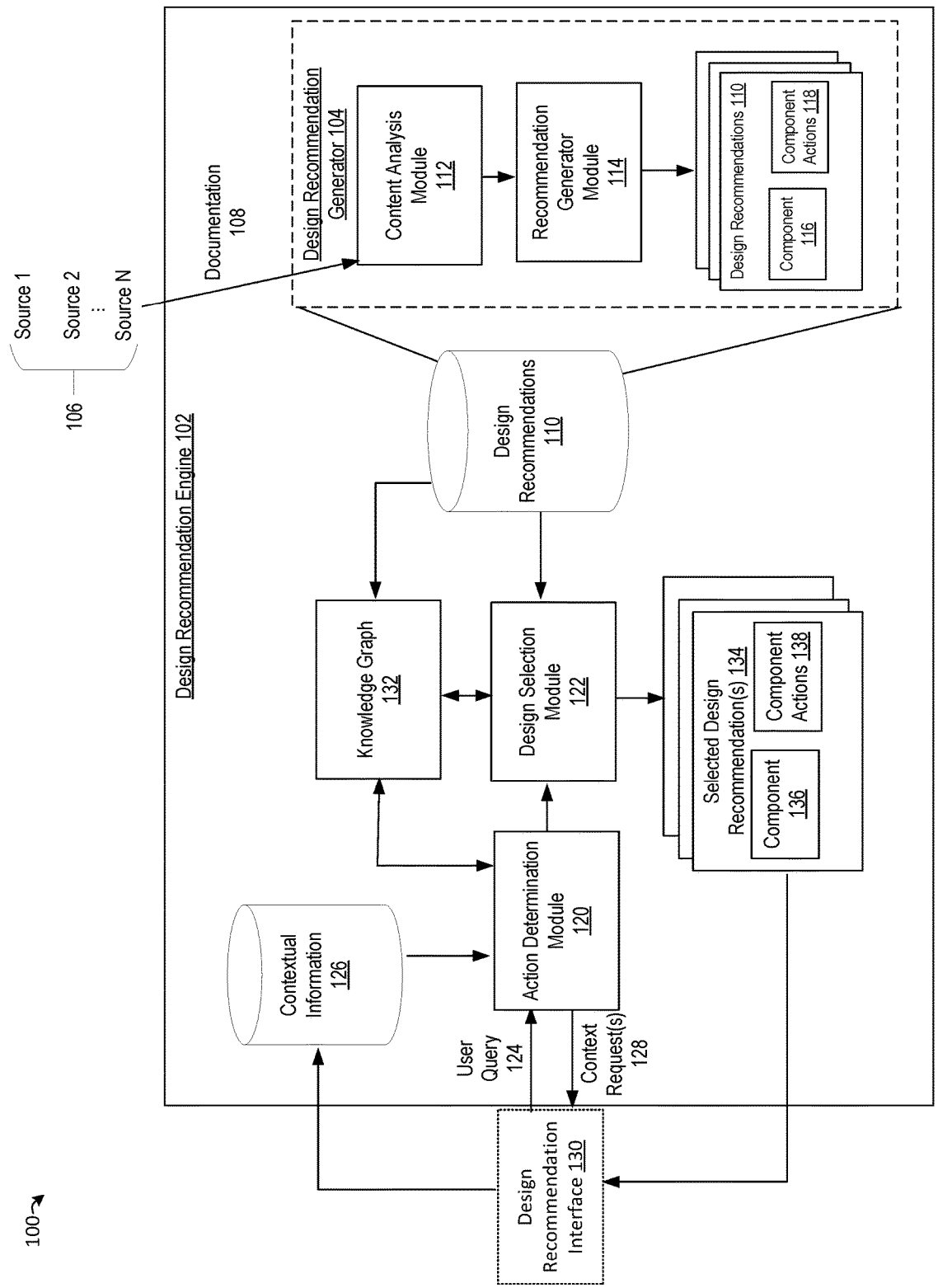
FIG. 1 depicts an example operating environment for a design recommendation engine.

In general, one innovative aspect of this technology is directed towards capturing the intelligent context of a design problem posed by the user. A user can provide a natural-language query to a component recommendation engine, where the query includes terms defining at least one desired function of a component or multiple components, e.g., one or more actions performed by the component. Additional contextual information for the design problem can be determined by the recommendation engine, providing constraints and/or further specifying the desired functions of the desired component(s). The contextual information can include, for example, a requirements list, fixed vs. variable constraints, forward-compatibility requirements, design goals, etc.

The additional contextual information can be generated through an intelligent dialog process and/or interactive process between the recommendation engine and the user, for example, in the form of a chatbot to prompt the user to provide the details and interpret the responses. A knowledge graph may be used to structure the dialog process and determine a progression of the interactive process.

The knowledge graph can include a known set of parts with connections to functions, use cases, and industries. For example, a known set of accelerometers can be linked in the knowledge graph to 1) functions such as motion detection, impact detection, motion tracking, and orientation detection, 2) use cases such as robotics, mobile phones, and flight controllers, and 3) industrial sectors such as automotive, military, and consumer electronics. An intelligent dialog and/or interactive process, e.g., in the form of a digital assistant, can tailor the conversation with the designers based on the connections in the knowledge graph. For example, a designer looking for a motion sensor can be presented with options based on function, then receive prompts from the digital assistant for industries and/or application areas in which the part will be used. The exchange between the digital assistant and designer can lead the designer to components that fit the particular industry.

The digital assistant can continue asking questions around the product category and associated types of products connected to the relevant nodes of the knowledge graph that are still valid based on previous questions and responses. As the digital assistant learns more about the designer's parameters and context, the part options are filtered down to a set that is more easily evaluated by an individual designer.

A context-informed solution to the design problem can be selected from a structured repository of design recommendations. Each design recommendation can include at least one recommended component and implementation details for the design recommendation. The repository can include documentation provided from multiple sources including, for example, product data sheets, OSHA documentation, white pages, academic journals, and open source/wiki-based expert contributions. $3^{rd}$-party submissions, e.g., from vendors of products, can be incorporated where companies can provide solutions for their own products and applications of their products.

To populate the knowledge graph, natural language processing tools can be used on various documents to extract information about specific components. Datasheets can be processed to extract part features but also for the descriptive text that describes possible application areas or reference solutions. Similarly, white papers or open-source hardware documentation can be processed to extract parts used in the design. Any known parts used in the product's design (extracted from the documentation) can be associated with the descriptions given in the text about the function of a product, the use-case, and the industry (also extracted from a relevant document). A further method of populating the knowledge graph is through part manufacturers explicitly adding relevant information when they upload their part to the database. Additionally, as designers use the components in their products, they can submit how they used the components in their designs, helping to improve the database by adding information on the use case, function, and industry.

Various rules-based engines can be implemented to best match a design problem with design recommendations. Rules can be generated, for example, from the content extracted from the uploaded documentation into the repository, e.g., specification/datasheets can define ranges of operation, dimensions, etc. which can be used to generate rules for finding a solution component to the problem function.

Feedback to the design recommendation engine can be provided by the end user, e.g., a user can provide details on how a design solution is implemented including one or more components. In some embodiments, components and/or systems can passively report details of usage, implementation, etc. back to the design recommendation engine, e.g., IoT-enabled devices.

A suggested solution is provided to the querying user including at least one recommended component and implementation details. The suggested solution can include a set of products, suppliers, etc. Rankings and/or rating-feedback (e.g., star-system) can be provided with the suggested solution, where rankings can identify various filters, e.g., prioritizing different goals, to assist in selecting a solution. Implementation details can include contextual information for form and function of each component included in the solution, e.g., how the component is used, reference designs, technical specifications, identifying limitations/advantages of the design.

A user-interface (UI) can be used to facilitate the user interaction with the design recommendation engine, including input of the query, providing contextual information through the intelligent dialog/interactive process, and receiving the design recommendations.

FIG. 1 depicts an example operating environment 100 for a design recommendation engine 102. Design recommendation engine 102 can be executed on one or more computing devices, e.g., servers, and can be accessed by one or more users over a network. In some implementations, the network includes a local area network (LAN), wide area network (WAN), the Internet, or a combination thereof, and connects websites, devices, and back-end systems. The network may be accessed over a wired and/or wireless communication link. The operations performed by the design recommendation engine can be performed, for example, by one or more cloud based servers, where a querying user may interact with the design recommendation engine 102 via a web-based application environment on a local device, e.g., as described in further detail with reference to FIG. 2 below.

Design recommendation engine 102 includes a design recommendation generator 104 which receives, from various sources 106, documentation 108 including design component information, and generates design recommendations 110 as output.

Design recommendation generator 104 includes a content analysis module 112 and a recommendation generator module 114. Though described with reference to FIG. 1 as a content analysis module 112 and recommendation generator module 114, the processes described with reference to the content analysis module 112 and recommendation generator module 114 can be performed by more or fewer modules.

Content analysis module 112 receives documentation 108 from the various sources 106 as input. Sources 106 can include, for example, manufacturers, in-house experts, end-users, or the like. Content 108 can include, for example, datasheets, white papers, open-source hardware documentation, and the like.

Content analysis module 112 may utilize a variety of processing techniques to extract component design information from documentation 108, e.g., using natural language processing. In one example, datasheets, e.g., product datasheets, OSHA documentation, and the like, can be processed to extract component features. Additionally, descriptive text within the documentation 108 can be processed to extract possible application areas or design solutions. In another example, white papers or open-source hardware documentation can be processed to extract parts used in the designs referenced in the respective documentation.

In some implementations, sources 106, e.g., part manufacturers, designers/end-users, etc., can explicitly provide component design information via documentation 108 to the content analysis module 112, where documentation 108 includes component information, use-cases/applications, function, industry, etc. The component design information provided can be input by the source 106 in a format such that the content analysis module 112 does not need to perform additional processing of the format prior to analyzing the content. Additionally, as designers use components in their products, designers may submit feedback including use of the components in designs, functions, and industries.

The recommendation generator module 114 can receive the component design information extracted by the content analysis module 112 as input and generate multiple design recommendations 110 as output. The recommendation generator module 114 can associate the known parts described in the documentation 108 with design information extracted from the documentation 108 including function(s) of the component, the use-case(s), and the relevant industries.

A design recommendation 110 includes a description of a component 116 and a component action 118, where a component action 118 defines a function, action, or operation of the component 116. The component actions 118 each are associated with one or more action attributes, e.g., ranges, values, or other discrete parameters that define the component actions 118 for the component 116. In one example, a component 116 described by the design recommendation 110 is a motion sensor and the associated component action 118 is sensing vibrations, and where an action attribute is a sensitivity to vibration between 0-1000 Hz. In another example, a component 116 is a GPU and the associated component actions 118 are GPU processing benchmarks, where the action attributes define values and/or ranges for each of the processing benchmarks.

In some implementations, a design recommendation 110 can include a description of multiple components 116 and/or multiple component actions 118 for each of the multiple components 116. The multiple components 116 can be sub-components of a larger system or apparatus including the multiple sub-components, where the design recommendation 110 can be directed towards both the local component actions 118 of each of the sub-components as well as global component actions 118 of the larger system or apparatus.

A knowledge graph 132 can be generated by the design recommendation engine 102 from the design recommendations 110 to assist the design recommendation engine 102 to select and provide a particular design recommendation 134 to a user in response to a user query 124. The knowledge graph 132 can include nodes each representing a known part(s) with connections to other nodes including functions, use cases, and industries. In one example, a known set of infrared lasers can be linked in the knowledge graph to 1) functions such as LIDAR, free-space data transmittal, and spectroscopy, 2) use cases such as satellites, fiber-optic based data communication, night-vision security, and 3) industrial sectors such as automotive, military, and telecommunications.

In some implementations, the knowledge graph may be populated by using natural language processing tools on the receiving documentation 108 from sources 106. Descriptive text from the various documentation 108 can be extracted by the design recommendation generator 104 to identify part features, applications areas, and/or information that references particular design solutions. Sources 106, e.g., part manufacturers, may explicitly populate the knowledge graph by uploading the relevant information to a design recommendation database 110. In some implementations, product designers can submit user feedback to the design recommendation engine 102 that details product features, industry use/application, etc., as well as the details of how they used the particular components in their designs. The feedback from product designers can be utilized to build out the nodes/connections of the knowledge graph 132.

As detailed below with reference to FIGS. 2 and 3, an intelligent component design assistant, e.g., a chatbot, can utilize the generated knowledge graph 132 to structure a dialog process with the querying user. The chat-bot can interact with the knowledge graph to produce the dialog interaction and discover the relevant context by using natural language processing and machine learning best practices. Using an initial query, the chat-bot can break down the query into a set of entities that exist on the knowledge graph or are related to terms that exist on the knowledge graph. Similarity to terms can be done through the use of word embeddings (i.e. word2vec) and once the chat-bot has identified a node on the graph as a starting point, it can find the n-nearest components related via various concepts. For example, a user query for a sensor that can detect hand movement will find similarity to the "sensors" area of the knowledge graph and then to the "movement" area. Various sensors will be connected to these nodes such as cameras, partial infra-red (PIR), and accelerometers. The chat-bot can then refine by asking the user questions based on other nodes connected to the components. For example, accelerometers may be linked to contact or mounted sensors, while cameras and PIR sensors may be linked to non-contact sensors. The chat-bot can then use these topics to form a question such as "Is this a contact or non-contact sensor?" The answer to this question can then remove one or more paths within the knowledge graph helping to refine which components will work for the designer's use case.

Design recommendation engine 102 additionally includes an action determination module 120 and design selection module 122, where the actions described herein with reference to the action determination module 120 and design selection module 122 can be performed by fewer or more modules.

Action determination module 120 can receive a user query 124 as input. User query 124 can include a natural language query from a user, e.g., a designer, where the user query 124 includes one or more terms. The user query 124 can be descriptive of a design problem including one or more component functions, actions, or operational parameters of an unknown component. The user query may not include any explicit description of a particular desired component, rather, the query 124 may only define desired functions or actions performed by an unknown component. In one example, a user query 124 can be "I am looking to measure a vibration between 0-1000 Hz."

The user query may include a description of known components in addition to desired functions, actions, or operational parameters of an unknown component. In other words, a user may be looking for an unknown component that performs one or more desired actions/functions with one or more known components. For example, a user query 124 can be "I am looking to couple a magnetic switch and an electric motor," where the magnetic switch and electric motor are both known components, and a desired function for the unknown component is to couple operation of the two known components together.

The action determination module 120 can using natural language processing or other processing techniques to determine a user intent from the one or more terms of the user query 124, where user intent can include one or more component actions or functions.

The action determination module 120 can receive additional contextual information 126 as input in addition to the user query 124. Additional contextual information can provide constraints and/or further specify the desired functions of the desired component(s), e.g., define action attributes for the desired component actions for the unknown component. The contextual information 126 can include, for example, a requirements list, fixed vs. variable constraints, forward-compatibility requirements, design goals, etc.

In some implementations, the action determination module 120 can request the additional contextual information from the user via a series of context request 128 provided to the user, for example, through a design recommendation interface 130. A design recommendation interface can include an intelligent dialog process and/or interactive process, e.g., a chatbot or digital assistant. The intelligent dialog process can prompt the user through a sequence of context requests 128 in order to acquire the contextual information 126. The operation of the intelligent dialog process and design recommendation interface are described in further detail below with reference to FIGS. 2 and 3.

Action determination module 120 can provide to the design selection module 122 a set of design considerations extracted from the user query and contextual information 126. The set of design considerations provided to the design selection module 122 can be formatted by additional context not provided during initial query. The additional context can be provided using a decision tree structure. For example, the context determination can include determining usage environment (can be generic such as indoor, outdoor, or dual purpose). Then the context determination can determine the relevant industry, e.g., an industry known to have unique safety or other regulated design constraints such as the automobile industry or nautical industry.

The design selection module 122 can receive the set of design considerations as input and select using the knowledge graph 132, one or more selected design recommendations 134 from the design recommendations 110 that are responsive to the user query 124 and contextual information 126 as output. As described above, the knowledge graph 132 includes a set of nodes defining components, functions/actions, industries/applications, etc., via a series of connections. The design selection module 122 can access the various nodes of the knowledge graph 132 and utilize a set of input design considerations to select one or more design recommendations 134 to provide to the querying user.

In some implementations, the design selection module 122 and action determination module 120 may use the relationships defined by the knowledge graph 132 to structure an intelligent dialog process between the design recommendation engine 102 and the querying user. In other words, the chatbot conversation can be defined by traversing a design path of the knowledge graph 132 to select a particular component in response to a user query 124 and additional contextual information 126 collected from the user via context requests 128.

In some implementations, the design selection module 122 includes one or more rules-based engines to best match a design problem defined by a querying user with a set of selected design recommendations 134. Rules for the rules-based engine can be generated using the knowledge graph 132 and/or from content extracted from the documentation 108 provided to the design recommendation generator 104. Ranges of operation, dimensions, action limitation, etc., can be extracted from the documentation 108 to generate rules for the rules-based engine. The design rules can be formatted as a set of branches along a decision tree and is similar to an expert system or to a machine learned decision tree. These can include binary (yes/no) splits as well as binned value splits (10-20, 20-30, 30-40). As the user selects aspects of the required part, the system can work through a set of rules that ultimately lead to different specific components. For example, imagine a user is selecting a sensor to measure vibrations for an industrial machine. A variety of questions can be considered in selecting which sensor to use. The questions can include: What is the vibration amplitude? What is the frequency range of interest? What is the temperature range required? Are any corrosive chemicals present? Is the atmosphere combustible? Are intense acoustic or electromagnetic fields present? Is there significant electrostatic discharge (ESD) present in the area? Is the machinery grounded? Are there sensor size and weight constraints? Indeed, in some implementations such questions can be extracted at least in part from the documentation associated with one or more components if such documentation is processed by implementation of a component recommendation system described in this specification.

In some implementations, the design selection module 122 can select the subset of design recommendations 134 using various selection criteria including a similarity of the desired component actions defined by the user query 124 and contextual information 126 and the component actions of the selected design recommendations 134. A threshold of similarity can be defined, where each selected design recommendation 134 at least meets the threshold of similarity between the component actions defined by the user query 124 and contextual information 126 and the component actions 138 of the selected design recommendation 134.

Other optimization criteria and thresholds of fit can be utilized, where a user may define selection parameters, e.g., cost analysis, environmental considerations, accessibility of component, preferred markets/manufacturers, etc., to select the set of design recommendations 134. In some implementations, the contextual information 126 provided by the user can define a requirements list that can be utilized by the design selection module 122 to set ranges, compatibility requirements, operating limitations, etc., for consideration when selecting the set of recommended designs. Further discussion of the requirements list is detailed with reference to FIG. 2.

Selected design recommendations 134 each include a recommended component 136 and component action 138 of the recommended component 136. A selected design recommendation is provided to the querying user as a possible solution including at least one recommended component and implementation details. The suggested solution can include a set of products, suppliers, etc. Rankings and/or rating-feedback (e.g., star-system) can be provided with the suggested solution, where rankings can identify various filters, e.g., prioritizing different goals, to assist in selecting a solution. Implementation details can include contextual information for form and function of each component included in the solution, e.g., how the component is used, reference designs, technical specifications, identifying limitations/advantages of the design.

The selected design recommendations 134 are provided as output by the design recommendation engine 102 to the querying user, e.g., via the design recommendation interface 130. Further description of the design recommendation interface is below with reference to FIGS. 2 and 3.

In some implementations, user feedback, e.g., from an end user, can be provided to the design recommendation engine 102. User feedback can be utilized to refine or enhance the knowledge graph 132 and/or the design recommendations 110. For example, a user can provide details on how a design solution is implemented including one or more components. In some embodiments, components and/or systems can passively report details of usage, implementation, etc. back to the design recommendation engine, e.g., IoT-enabled devices.

Figure 2:
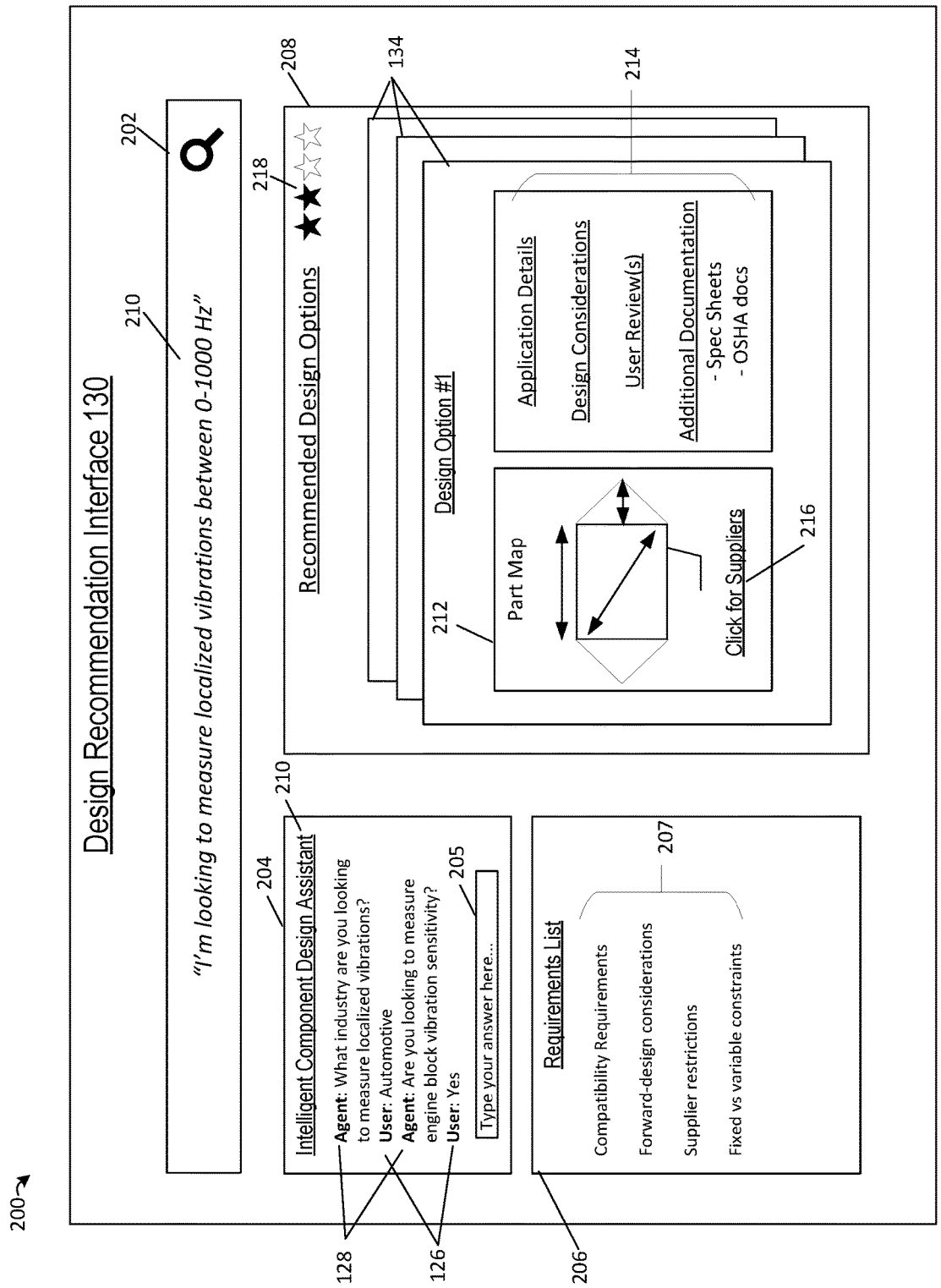
FIG. 2 depicts an example application environment for a design recommendation interface.

FIG. 2 depicts an example application environment for a design recommendation interface. Design recommendation interface 130 can be presented to a user in an application environment on a user device, such as a desktop computer, a laptop computer, a handheld computer, a tablet computer, a personal digital assistant (PDA), a cellular telephone, a smart phone, an enhanced general packet radio service (EGPRS) mobile phone, a media player, a navigation device, an email device, a game console, or an appropriate combination of any two or more of these devices or other data processing devices. A user may access the design recommendation engine 102 via the design recommendation interface 130 in the application environment.

As depicted in FIG. 2, design recommendation interface 130 includes a query entry bar 202, intelligent component design assistant window 204, a requirements list window 206, and a recommended design options window 208. Additional features can be included in the design recommendation interface 130 to facilitate the interaction between a querying user and the design recommendation engine 102.

Certain implementations of a design recommendation engine can include a graphical representation of the knowledge graph that a user can see, and in certain implementations the user can interact with a representation of the knowledge graph. As the user filters down the context of what the user is seeking, the user can see what kinds of parts are being filtered out. Having an overview view allows the user to see all options the user may not considered.

Query entry bar 202 is configured to receive a textual, verbal, or other form of user-provided query 210, e.g., user query 124, to the design recommendation engine 102. In one example, the user-provided query 210 can be a natural language query, e.g., "I'm looking to measure localized vibrations between 0-1000 Hz." The user-provided query 210 can include a set of terms defining one or more functions of an unknown component, e.g., "vibration measurement," "0-1000 Hz,", and "agriculture."

The intelligent component design assistant window 204 includes an intelligent dialog process 210, e.g., a chatbot/digital assistant, through which the design recommendation engine 102 can interact with a querying user and provide context requests 128 to the user. As depicted in FIG. 2, the intelligent component design assistant window 204 displays a set of clarifying questions, e.g., context requests 128, from an agent, and responses entered in by the user in response to the context requests 128. The window 204 further includes a dialog box 205 through which the user can enter in a response.

In some implementations, the design recommendation engine 102 can utilize the intelligent component design assistant window 204 to collect the additional contextual information 126. The set of context requests 128 provided to the user through the intelligent component design assistant window 204 can be selected using a knowledge graph 132. The dialog process can follow a linear logic sequence to narrow the scope of contextual information to be obtained from the system user. Various contextual aspects of the design can be captured through questions from the dialog system. The dialog system can ask questions related to different paths along the knowledge graph for example what industry application or what environment will a part be used. As the user answers questions, some paths can be removed while other remain, filtering down the potential components for the designer to consider.

Design recommendation engine 102 can further collect additional contextual information 126 from the user via a requirements list window 206, where the requirements list window 206 presents a set of component design considerations 207 for a user to provide the additional contextual information 126. As depicted in FIG. 2, the component design considerations 207 include compatibility requirements, forward-design considerations, supplier restrictions, and fixed versus variable constraints. Other component design considerations 207 are possible, where the user can enter in the additional contextual information 126 manually and/or which can be imported to the design recommendation interface 120, e.g., from a user profile, saved user history, or the like. For example, a user from the automotive industry may have a user account for the design recommendation engine 102 that has saved search history, component recommendations, industry information, and the like, which can be used to inform a design recommendation in response to a current user query 210.

The design recommendation interface 130 further includes a recommended design options window 208 through which the user can view the selected design recommendations 134 that are selected by the design selection module 122 responsive to the user query 210, e.g., user query 124. The recommended design options window 208 can be configured to allow a user to view and interact with multiple design recommendations 134, compare/contrast the multiple design recommendations 134, and provide feedback to the design recommendation engine 102 about the selected design recommendations 134.

Each design recommendation 134 provided in the recommended design options window 208 can include information related to the particular design recommendation 134, e.g., information about the component 136 and component actions 138. As depicted in FIG. 2, each selected design recommendation 134 includes a part map 212, and a set of component details 214, e.g., application details, design considerations, user reviews, additional documentation, and the like. Additionally, the user can select a link or select to view a list of suppliers 216 for the particular component of the selected design recommendation 134. Additional documentation can be viewed by the user via the recommended design options window 208, e.g., specification datasheets, OSHA documentation, white papers, and the like.

In some implementations, user reviews of the design recommendation can be viewed by the user in the recommended design options window 208. User reviews can include feedback from other users who have sought similar component actions and utilized the particular design recommendation 134 in response. User reviews can be presented based on a similarity of industry and/or application as the current user query 124, where only user reviews meeting a threshold of relevance to the current user query 124 can be provided with the particular design recommendation. For example, user reviews submitted by other users seeking vibration measurements in the automotive industry may be provided with the design recommendation 134, and user reviews submitted by other users seeking vibration measurements in the microelectronics fabrication industry may be omitted.

In some implementations, the component details 214 included with each selected design recommendation 134 presented to the querying user in the design recommendation interface may provide a rating 218, e.g., ranking and/or scoring, by the design recommendation engine 102 for the relevance or utility of the component responsive to the user's query 124. For example, a set of selected design recommendations 134, e.g., 5 design recommendations, can be presented to the user in the recommended design options window 208, where each design recommendation 134 is accompanied by a ranking, e.g., relative to each other selected design recommendation 134, or a relevance score, e.g., with respect to the determined user's intent.

Figure 3:
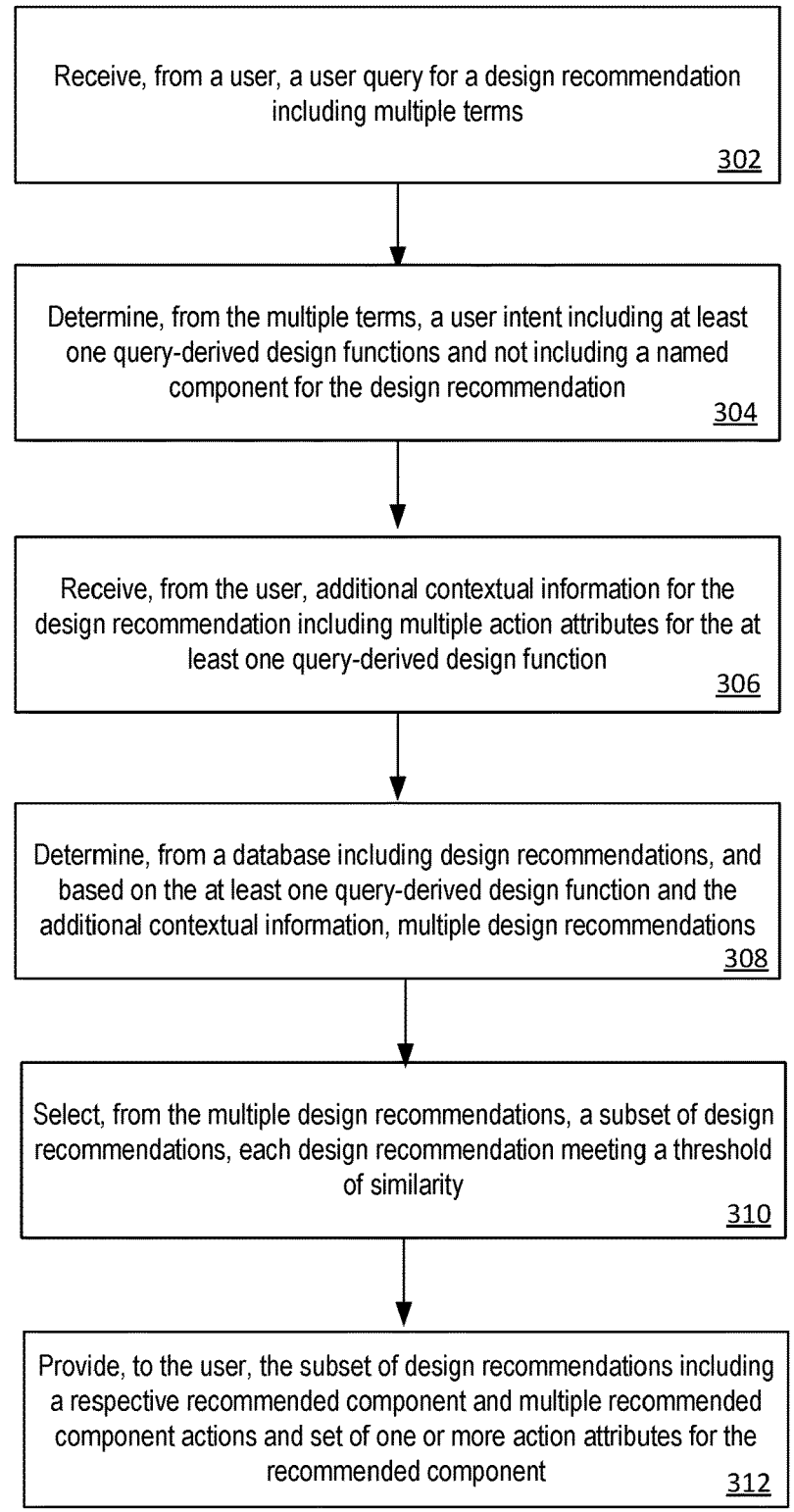
FIG. 3 depicts an example process for the design recommendation engine.

FIG. 3 depicts an example process 300 for the design recommendation engine.

A user query for a design recommendation is received from a user including multiple terms (302). A user may enter a user query 124 via a design recommendation interface 130, e.g., a textual-based query or verbal query in a query entry box 202. The user query 124 includes one or more terms descriptive of at least one component action that is being sought by the user for an unknown component.

In some implementations, user query 124 can include a query image, where the one or more terms descriptive of the component action can be extracted from the query image, e.g., using image processing techniques. For example, a user may submit an image of one or more known components and which is missing an unknown component, e.g., a joint piece or connector. Image processing techniques can be utilized to identify the known components, context/application clues, etc. The user may further include a verbal or textual-based query in addition to the query image to provide additional context. In another example, image processing can be used to determine text appearing within the query image, e.g., using OCR or similar techniques.

User query 124 can be provided by the user as a natural language query, where natural language processing techniques can be used to parse the user query 124 into multiple terms. A user intent is determined from the multiple terms, where the user intent includes at least one query-derived design function and does not include a named component for the design recommendation (304). The query-derived design function includes a component action, function, or application, e.g., "detects localized vibrations," or "performs 10 teraflops." The user intent does not include an explicitly named component, e.g., does not provide a component name or identification label.

In some implementations, the user intent may include an ambiguously-named component, where a user providing the user query is unsure of the product name, manufacturer name, or the like. In one example, the ambiguously-named component includes a misspelled, or partially-incorrect product/component name.

Additional contextual information for the design recommendation is received from the user including multiple action attributes for the at least one query-derived design function (306). The additional contextual information 126 can be provided to the design recommendation engine 102 by a user, for example, through a requirements list window 206 of a design recommendation interface 130. The additional contextual information 126 can be entered into the requirements list window 206, including multiple component design considerations 207.

In some implementations, component design considerations 207 include fixed vs variable constraints, where a user may define one or more restrictions and one or more ranges related to the desired unknown component. Constraints can include, for example, physical dimensions, materials, operating temperature, power requirements, or the like. In one example, a fixed constraint can be to restrict the component to no larger than a particular footprint, e.g., for an integrated circuit component that must fit in a particular slot of a motherboard. In another example, a variable constraint can be a range of operating temperatures for an infrared light sensor.

In some implementations, component design considerations 207 include forwards-compatibility requirements, where a user may define one or more aspects of an existing design with which the selected design recommendations 134 will need to be compatible. In one example, a forwards compatibility requirement can include a communication protocol for the existing design with which any selected design recommendations 134 will have to be compatible. In another example, an existing design may include a component having a physical design aspect that will need to be accounted for in any design recommendations, e.g., a thread count of a coupler will need to be compatible with an existing receiving threaded part.

In some implementations, component design considerations 207 include supplier restrictions. Supplier restrictions can be, for example, a set of preferred or ranked suppliers of the desired components, e.g., domestic vs foreign suppliers, or suppliers who adhere to a particular set of industry standards, e.g., UI, ASME, etc.

Additional contextual information 126 can be user preferences and/or user settings that are automatically or semi-automatically provided to the design recommendation engine 102 from a user profile or tracked user history. In some implementations, the user can opt to have their interactions with the design recommendation engine 102 saved such that new search queries 124 can be contextualized using past queries, design recommendations, and user feedback.

In some implementations, the additional contextual information 126, e.g., the component design considerations 207, can be provided to the design recommendation engine 102 via a dialog process or intelligent digital assistant, e.g., via an intelligent component design assistant window 204 in a design recommendation interface 130. The dialog process can provide, to the user and via an intelligent component design assistant 204, a set of context requests 128 and receive, from the user, the additional contextual information 126 from the user in response. The responses from the user can be provided to the design recommendation engine 102 in the form of natural language responses, which can be processed using natural language processing by the action determination module 102, to contextualize the responses into usable contextual information 126.

Multiple design recommendations are determined from a database including design recommendations and based on the at least one query-derived design function and the additional contextual information (308). As described above with reference to FIG. 1, a database of design recommendations 110 can be generated using a design recommendation generator 104, where the design recommendation database 110 includes multiple design recommendations generated from documentation 108 provided by sources 106. Each design recommendation 110 includes information describing a component 116 and one or more component actions 118 for the component 116, e.g., functions performed by the component. The design selection module 122 may identify a set of design recommendations 110 from the database utilizing a knowledge graph 132, where the knowledge graph 132 defines relationships between components, functions, industries/applications, and the like. The design selection module may traverse the knowledge graph 132 using the query-derived design function and additional contextual information 126 to identify the design recommendations 110 that define components having associated component actions that meet at least a threshold of similarity and/or meet another selection criteria as described above with reference to FIG. 1.

In some implementations, searching the database of design recommendations 110 includes converting, by the action determination module 120, the query-derived design functions and additional contextual information into a query vector for the user query 124. The database of design recommendations 110 may be converted into a set of recommendation vectors, each descriptive of a component and one or more component actions. Selecting the subset of design recommendations responsive to the user query can then be performed by comparing the respective recommendation vector to the query vector.

A subset of design recommendations are selected from the multiple design recommendations, where each design recommendation meets a threshold of similarity (310). The subset of design recommendations 134 each define a component 136 and one or more component actions 138 for the component 136. In one example, as described above, the user query 124 and contextual information 126 may be converted into a query vector and compared to a set of generated recommendation vectors for the various design recommendations, to determine which of the recommendation vectors meet a threshold of similarity to the query vector.

The subset of design recommendations are provided to the user, where each of the subset of design recommendations includes a respective recommended component and multiple recommended component actions and a set of one or more action attributes for the recommended component (312). The subset of design recommendations can be provided to the user in the design recommendation interface 130, e.g., in a recommended design options window 208. A user may be able to interact with each of the select design recommendations 134, e.g., to learn more about why each of the design recommendations 134 were selected, view further details about the particular component 212, view suppliers 216 for the component, and the like.

The design recommendation engine 102 may receive, from the querying user, user feedback responsive to the provided subset of design recommendations 134, e.g., a user may provide positive or negative reviews of the design choice. In one example, a user may provide a rating for the suggestion design recommendations, for example, via natural language feedback, e.g., "this is not an appropriate part for what I'm looking for." In another example, a user may provide a rating using a scale, e.g., a number of stars 218. The design recommendation engine 102 may use the received user feedback to refine the knowledge graph 132 and/or rules-based engine for future recommendations responsive to similar user queries 124.

In some implementations, user feedback is received in the form of a user selection of a particular design recommendation of the subset of design recommendations 134. A user preference may be logged in a user profile for future selection of recommendations, e.g., as contextual information 126, and/or may be used to refine the knowledge graph 132 for providing recommended designs to other querying users who provide similar user queries 124 and contextual information 126.

In some implementations, user feedback includes collecting usage data for a particular design recommendation 134 including a recommended component 136. Usage data can be provided by a user directly, e.g., in the form of a responding to a survey or interaction with an intelligent dialog process. In some implementations, usage data is provided by the recommended component to the design recommendation engine 102, e.g., by an IoT component. For example, a component may be a vibration sensor deployed under water to detect seismic activity. The sensor may provide, via the network, data describing the use and/or utilization of the sensor as feedback to the design recommendation engine 102.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Figure 4:
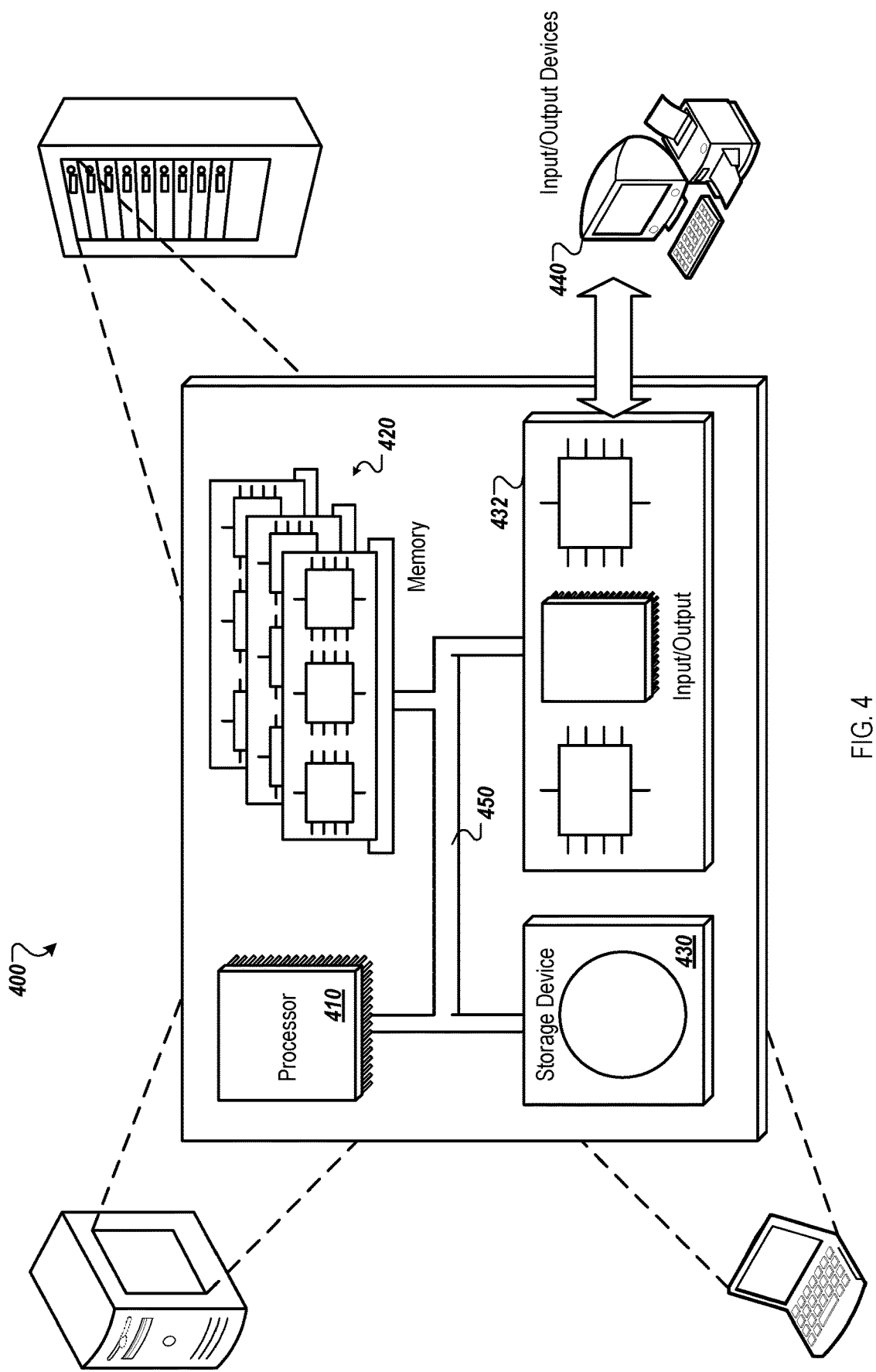
FIG. 4 is a block diagram of an example computer system.

An example of one such type of computer is shown in FIG. 4, which shows a schematic diagram of a generic computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output module 432 includes hardware or hardware and software for interfacing system 400 with the input/output device 440 or other devices or interfaces.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
   storing a database of design recommendations, each design recommendation indicating:
      a component comprising a manufactured part; and
      at least one feature of the component, the at least one feature comprising one or more of a component action, an action attribute, an industry, or a use-case;
   receiving, from a user, a user query for a design recommendation, the user query comprising a plurality of terms;
   determining, from the plurality of terms, a user intent including a query-derived feature and not including a named component for the design recommendation;
   accessing a knowledge graph comprising nodes and connections between the nodes, wherein a first set of the nodes represents components of the design recommendations, a second set of the nodes represents features of the components, and the connections represent associations between the components and the features;
   selecting, from the database of design recommendations and using the knowledge graph, a subset of design recommendations, each design recommendation of the subset meeting a threshold of similarity between the at least one feature of the component indicated by the design recommendation and the query-derived feature;
   providing, for display by a user device, the subset of design recommendations;
   receiving, from the user, user feedback responsive to the subset of design recommendations;
   receiving usage data based on the user feedback; and
   updating the knowledge graph based on the usage data.

2. The method of claim 1, comprising receiving additional contextual information for the design recommendation from the user using a dialog process.

3. The method of claim 1, comprising receiving additional contextual information from the user including a plurality of component design considerations.

4. The method of claim 3, wherein component design considerations comprise fixed vs variable constraints.

5. The method of claim 3, wherein component design consideration comprise forwards-compatibility requirements.

6. The method of claim 1, comprising receiving additional contextual information for the design recommendation including user preference data.

7. The method of claim 1, further comprising, generating, from the at least one feature of the component, a query vector for the user query.

8. The method of claim 7, wherein the database of design recommendations comprises a database of recommendation vectors, each recommendation vector representing a design recommendation, and wherein selecting the subset of design recommendations responsive to the user query comprises comparing the respective recommendation vectors to the query vector.

9. The method of claim 1, wherein the user feedback comprises a selection, by the user, of a particular design recommendation of the subset of design recommendations.

10. The method of claim 9, wherein the particular design recommendation indicates a component comprising an internet-of-things enabled device, and wherein the usage data indicates a usage of the component.

11. One or more non-transitory computer-readable storage media coupled to one or more processors and having instructions stored thereon which, when executed by the one or more processors, cause the one or more processors to perform operations for a design recommendation engine, the operations comprising:
   storing a database of design recommendations, each design recommendation indicating:
      a component comprising a manufactured part; and
      at least one feature of the component, the at least one feature comprising one or more of a component action, an action attribute, an industry, or a use-case;
   receiving, from a user, a user query for a design recommendation, the user query comprising a plurality of terms;
   determining, from the plurality of terms, a user intent including a query-derived feature and not including a named component for the design recommendation;
   accessing a knowledge graph comprising nodes and connections between the nodes, wherein a first set of the nodes represents components of the design recommendations, a second set of the nodes represents features of the components, and the connections represent associations between the components and the features;
   selecting, from the database of design recommendations and using the knowledge graph, a subset of design recommendations, each design recommendation of the subset meeting a threshold of similarity between the at least one feature of the component indicated by the design recommendation and the query-derived features;
   providing, for display by a user device, the subset of design recommendations;

receiving, from the user, user feedback responsive to the subset of design recommendations;
receiving usage data based on the user feedback; and
updating the knowledge graph based on the usage data.

12. A system, comprising:
one or more processors; and
a computer-readable storage device coupled to the one or more processors and having instructions stored thereon which, when executed by the one or more processors, cause the one or more processors to perform operations for a design recommendation engine, the operations comprising:
storing a database of design recommendations, each design recommendation indicating:
a component comprising a manufactured part; and
at least one feature of the component, the at least one feature comprising one or more of a component action, an action attribute, an industry, or a use-case;
receiving, from a user, a user query for a design recommendation, the user query comprising a plurality of terms;
determining, from the plurality of terms, a user intent including a query-derived feature and not including a named component for the design recommendation;
accessing a knowledge graph comprising nodes and connections between the nodes, wherein a first set of the nodes represents components of the design recommendations, a second set of the nodes represents features of the components, and the connections represent associations between the components and the features;
selecting, from the database of design recommendations and using the knowledge graph, a subset of design recommendations, each design recommendation of the subset meeting a threshold of similarity between the at least one feature of the component indicated by the design recommendation and the query-derived feature;
providing, for display by a user device, the subset of design recommendations;
receiving, from the user, user feedback responsive to the subset of design recommendations;
receiving usage data based on the user feedback; and
updating the knowledge graph based on the usage data.

13. The system of claim 12, the operations comprising receiving additional contextual information for the design recommendation from the user using a dialog process.

14. The system of claim 12, the operations comprising receiving additional contextual information from the user including a plurality of component design considerations.

15. The system of claim 12, the operations comprising receiving additional contextual information for the design recommendation including user preference data.

16. The system of claim 12, the operations comprising generating, from the at least one feature of the component, a query vector for the user query.

17. The method of claim 2, wherein the dialog process comprises generating, using the knowledge graph, one or more prompts for the user to provide the additional contextual information.

* * * * *